US006951088B2

(12) United States Patent
Rodriguez

(10) Patent No.: US 6,951,088 B2
(45) Date of Patent: Oct. 4, 2005

(54) BALE BANDING MACHINE AND METHOD

(76) Inventor: Peter A. Rodriguez, 1545 Main St., Atlantic Beach, FL (US) 32233

( * ) Notice: Subject to any disclaimer, the term of this patent is extended or adjusted under 35 U.S.C. 154(b) by 0 days.

(21) Appl. No.: 10/786,523

(22) Filed: Feb. 25, 2004

(65) Prior Publication Data

US 2005/0183403 A1 Aug. 25, 2005

(51) Int. Cl.[7] ............................................. B65B 13/32
(52) U.S. Cl. ...................... 53/399; 53/589; 53/375.2; 100/2; 100/26; 100/29
(58) Field of Search ................... 53/399, 580, 582, 53/589, 375.2; 100/2, 8, 26, 29, 33 R

(56) References Cited

U.S. PATENT DOCUMENTS

| | | | |
|---|---|---|---|
| 3,330,409 A * | 7/1967 | Jorgensen ........................ 100/1 |
| 4,478,658 A * | 10/1984 | Wittwer ........................ 53/399 |
| 5,022,316 A * | 6/1991 | Hellwig ........................ 100/8 |
| 5,560,180 A | 10/1996 | Rodriguez et al. |
| 6,202,387 B1 * | 3/2001 | Brown et al. .................. 53/419 |
| 6,363,689 B1 | 4/2002 | Rodriguez et al. |
| 6,546,696 B2 * | 4/2003 | Cranston, III et al. ........ 53/399 |

* cited by examiner

Primary Examiner—Stephen F. Gerrity
(74) Attorney, Agent, or Firm—Thomas C. Saitta

(57) ABSTRACT

A banding machine and method for banding bundles of material using a thermal and moisture activated adhesive baleband. In one embodiment the banding machine includes a sealing station that guides and tightens the baleband around a bale such that a portion of the baleband is overlapped. The sealing station also connects or seals the overlapped end portions of the band after tightening the band about a bale and cuts the band as overlapped end portions are connected. The overlapped end portions are adhesively connected or sealed using a steam or hot water applicator mechanism and associated actuator controller for applying pressurized steam or hot water to the overlapped end portions of the baleband.

22 Claims, 3 Drawing Sheets

BALE BANDING MACHINE AND METHOD

BACKGROUND OF THE INVENTION

1. Technical Field

The present invention relates generally to packaging of material using straps or bands, and in particular to bale banding systems and methods for banding bales that utilize adhesives to join or seal the baleband about the material being banded. More particularly, the present invention relates to an improved system and method for sealing pulpable balebands during the bale banding process where heat and moisture are required for the creation of an adhesive bond.

2. Description of the Related Art

Bale banding machines are known in the prior art that are designed to use cellulose-based bale banding straps in place of traditional metal banding to address the known problems associated with metal wire banding, such as the need to cut, handle and dispose of the metal banding after use. The use of cellulose-based bands allows the bands to be easily disintegrated, a characteristic which is particularly useful in the handling of wood pulp bales, since the banded bales can be processed directly without need for removing the band.

For example, U.S. Pat. No. 5,560,180, the disclosure of which is incorporated herein by reference, discloses a representative strapping station used in combination with a bale material conveyor. The strapping station is mounted on a movable platform and includes an encircling track for guiding a strap around a bale and a sealing head which contains a driving wheel to advance the strap in the track and, upon reversing the driving wheel, to tighten the strap around the bale. The strapping station further includes a clamping cam wheel, an adhesive applicator, a clamp to hold together two overlapping pieces of strap with adhesive applied until the adhesive has cured, and a cutter to sever the continuing strap and release it to be a tight band around the bale. The strapping station disclosed by U.S. Pat. No. 5,560,180 encircles bales of material with repulpable paper straps, whereby an adhesive is applied to the forward end of the strap, the adhesive-coated strap is overlapped with the continuing strap, and the overlapped portion is pressed until the adhesive is cured.

An improvement to the strapping station disclosed by U.S. Pat. No. 5,560,180 is described in U.S. Pat. No. 6,363,689, the disclosure of which is incorporated herein by reference, which discloses a representative banding machine having an improved bale banding adhesion method whereby the band is pre-coated or pre-impregnated with heat and/or moisture activated adhesive. Sealing of a band around a bale is accomplished using a thermoelectric heater tongue that is inserted between the inner faces of the overlapped band ends which are forced toward the heater tongue to heat activate the band adhesive. The heater tongue is then retracted and the overlapped, heat activated portions of the band are pressed together to secure the band around the bale. Since most adhesives are both heat and moisture activated, the foregoing band sealing technique also includes a water injector feature for wetting at least one of the ends of baleband during the band feeding operation and prior to inserting the heater tongue therebetween.

A problem encountered by such systems, however, is that the wetted portion of the baleband may become tacky, resulting in excess friction and possible binding as the band is fed through the close tolerance feed channel of the bale strapping track assembly. It would therefore be a useful improvement over the prior art to provide a baleband sealing system and method that eliminates such process inefficiencies. The present invention addresses such a need.

SUMMARY OF THE INVENTION

In one representative aspect of the present invention there is provided a banding machine for cooperation with and between an upstream and a downstream horizontal conveyor upon which loose bales of material are moved to be wrapped into tight bales including a support frame locatable transversely with respect to a longitudinal direction of the conveyors and between the conveyors, the banding machine having an arched track with spaced vertical and horizontal members for guiding a band transversely and completely around a loose bale disposed within the arched track. The banding machine includes a sealing station adjacent one vertical member and has an automatic means for selectively gripping a forward end of a band. The sealing station has a reversible drive wheel for driving a band forward through the track with an overlap of a band located adjacent one vertical member and for applying reverse force to tighten a band around a bale after actuation of the automatic means for selectively gripping. The sealing station also has means for connecting overlapped end portions of the band after tightening the band about a bale and means for cutting the band as overlapped end portions are connected. Of primary importance relative to this disclosure, the means for connecting include a steam applicator or injector mechanism and associated actuator controller for applying pressurized steam or super-heated water to the opposing, internally-facing sides of the overlapped end portions of the baleband.

Further aspects of the present invention include a banding apparatus for cooperation with and between an upstream and a downstream horizontal conveyor upon which loose bales of material are moved to be wrapped by said apparatus into tight bales comprising a support frame adapted and arranged to be disposed to a longitudinal direction of and between an upstream and a downstream conveyor, a banding machine mounted on the platform, a supply of a stiff flat band of repulpable paper fibers held together with water-soluble adhesive having inner and outer surfaces, the banding machine including an arched track having spaced vertical and horizontal members for guiding the band transversely and completely around a loose bale disposable within the arched track, sealing means adjacent one vertical member for connecting the band to itself. The sealing means includes automatic means for selectively gripping the forward end portion of the band after passing completely through the arched track, the sealing means including a reversible drive wheel for driving the band forward through the track with an overlap of the band adjacent one vertical member and for applying reverse force on the band to tighten the band around a bale after actuation of the automatic means, means for applying steam or superheated steam to the forward end portion of the band included and also means for clamping the forward end portion and another portion of the band overlapped therewith after tightening thereof, together with the adhesive being located in the portions and the clamping means including means for cutting the band as the portions are tightly secured by the adhesive. The sealing means further includes a steam or superheated water applicator element for simultaneously moistening and heating at least one portion of the band. The track includes a support member, and movable covering means over the support member for removably securing the band to the support member. There is also lifting means for selectively moving the sealing means vertically.

The above as well as additional objects, features, and advantages of the present invention will become apparent in the following detailed written description. It is to be understood that the particular operational and structural aspects of the bale banding equipment are secondary to the sealing means, in that the sealing means and method utilizing steam or superheated water is of primary importance, and that various and distinct types of bale banding equipment may incorporate the sealing means and method as described herein.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

The present invention is directed to a baling system for securing pulp bales with a baleband. More specifically, the present invention is directed to a bale banding system in which the banding material is coated or impregnated with a heat/moisture activated adhesive material. The banding system of the present invention improves upon known bale banding adhesion methods that utilize a conductive heater element sometimes in conjunction with a moisture applicator to activate the band adhesive during the banding process. As explained in further detail with reference to the figures, the present invention advantageously employs a steam or superheated water applicator mechanism that eliminates many sources of process inefficiencies including the binding of pre-wetted bands within the banding machine feed track encountered when using heat conductive band adhesion techniques, since the steam applicator mechanism delivers the required heat and moisture at the sealing location itself.

It is to be understood that the term "steam" as used herein and hereafter shall be taken to include superheated or hot water, i.e., water containing sufficient heat energy such that when sprayed, misted, fogged or otherwise directed into a space between the two ends of a baleband to be joined, will transfer enough heat energy and moisture to the bands to effect adhesion of the band ends without need for additional heat transfer or heat application means. This temperature may be below the temperature of steam in certain applications.

Figure 1:
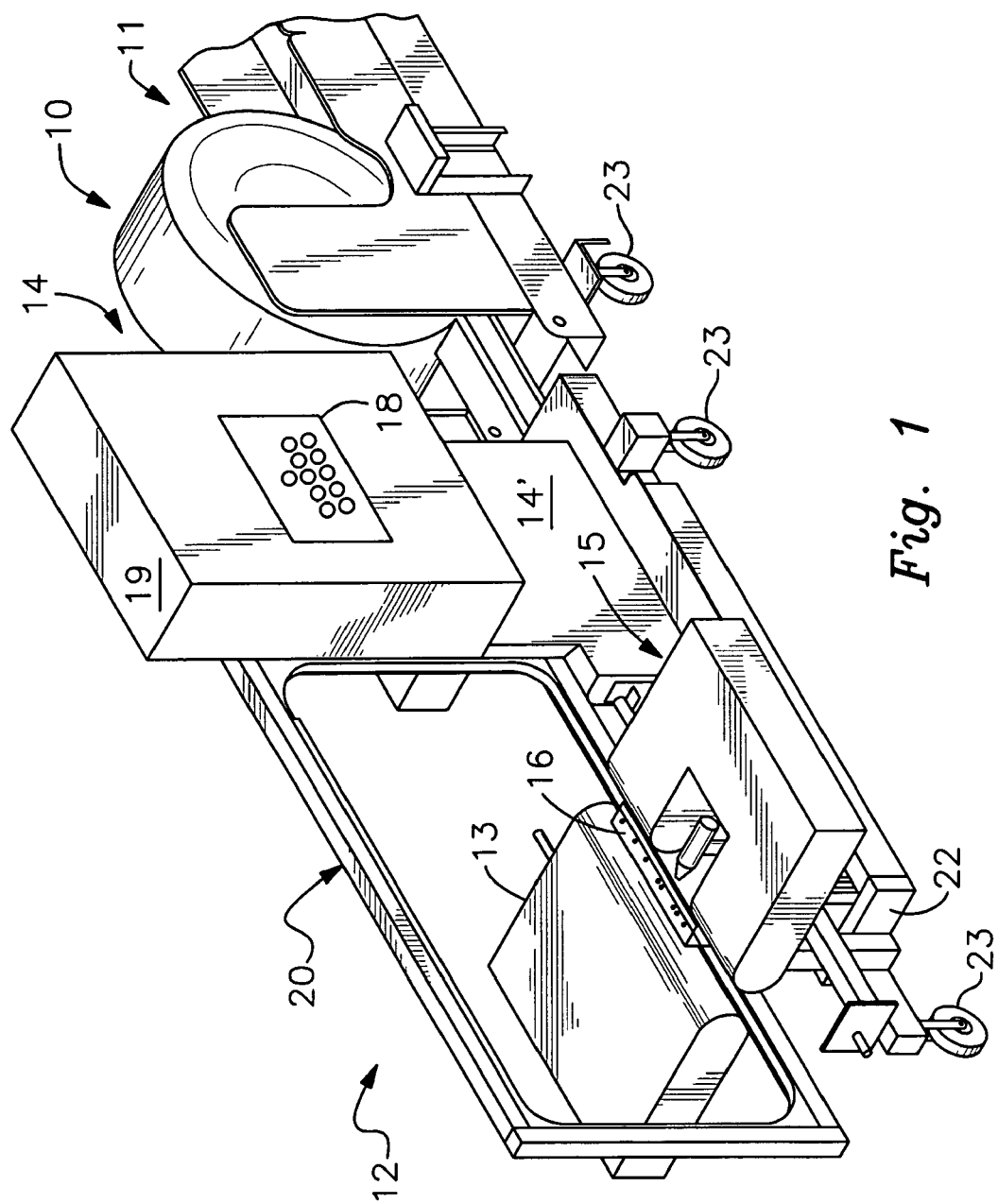
FIG. 1 is a perspective view of a banding machine in accordance with the present invention positioned transverse a bale-carrying conveyor system.

With respect now to the figures, wherein like reference numerals refer to like and corresponding parts throughout, and in particular with reference to FIG. 1, there is depicted a banding machine 10 in accordance with the present invention positioned transverse a bale-carrying conveyor system 13. The unwind station is designated generally at 11 and is physically distinct from the dispenser station generally at 12. Conveyor system 13 is supplied by the host mill in which banding machine 10 is used.

A load system 14 includes a loop storage magazine 14' and receives baleband from unwind station 11 and provides it to a feed system 15. A dispenser head 16 is shown only generally in FIG. 1, as are an electric control panel 18 and an associated load system enclosure 19. A track assembly 20 receives pulp baleband therein from feed system 15. The dispenser station 12 and unwind station 11 are each mobile via a frame 22 that rides on rollers 23. More detail describing the structure and operating features of dispenser station 12 is provided in U.S. Pat. No. 6,363,689, the entire content of which is incorporated herein by reference.

Figure 2:
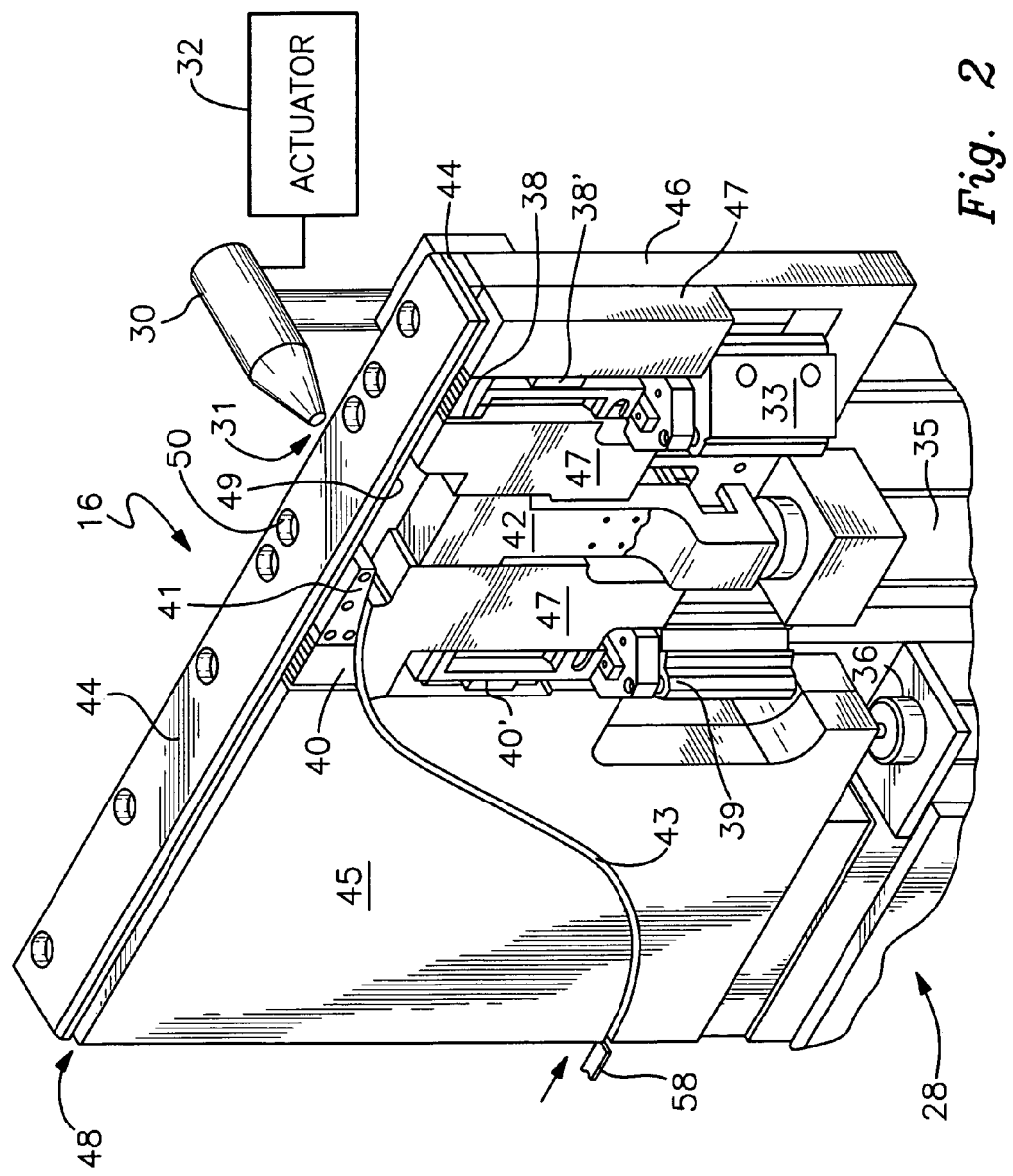
FIG. 2 is a partial detail view of a dispensing station incorporated within the banding machine depicted in FIG. 1.
Figure 3:
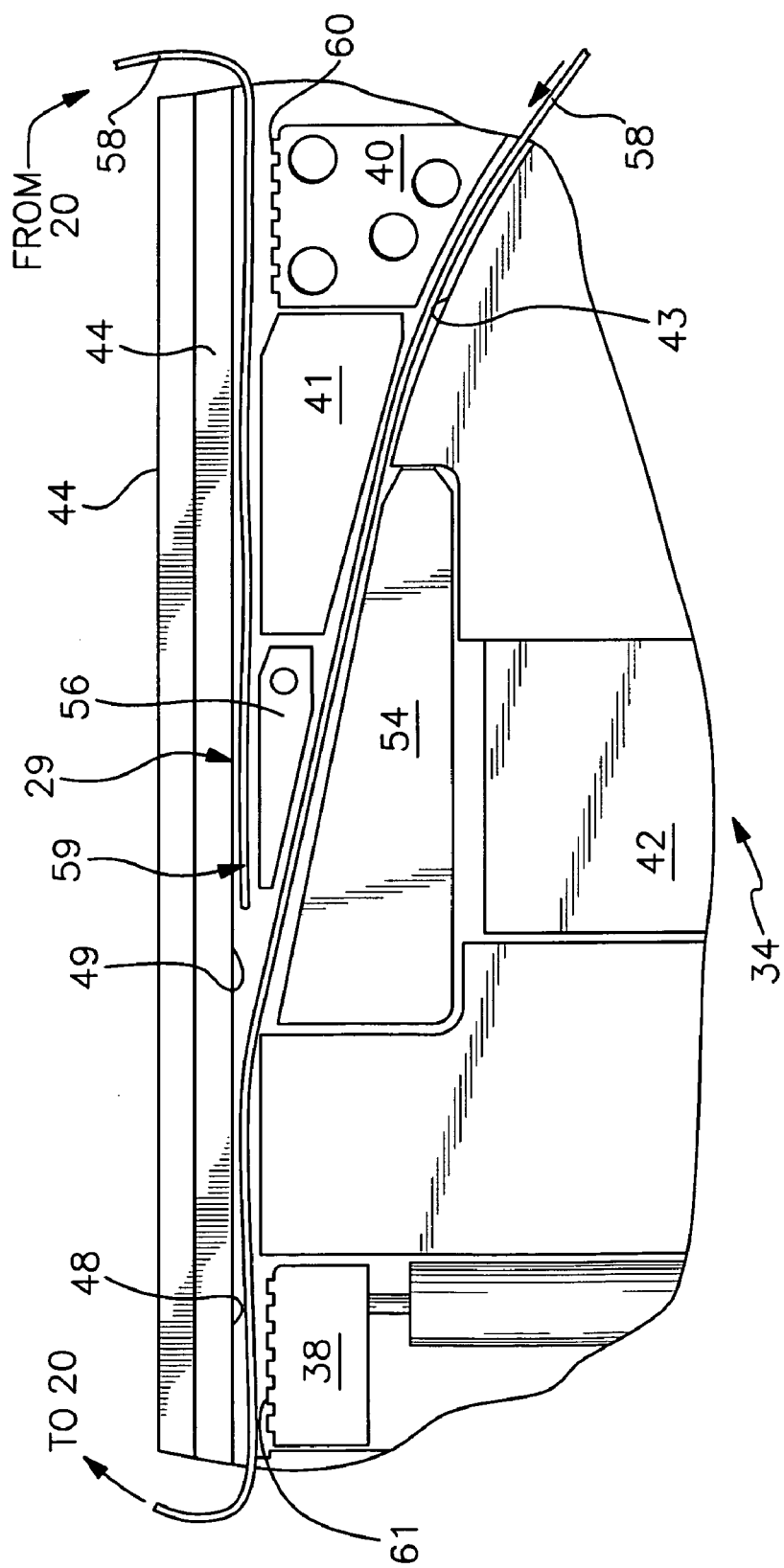
FIG. 3 illustrates a profile view of the dispenser head of the dispenser station of FIG. 1.

FIGS. 2 and 3 illustrate a partial detail view and a profile view, respectively, of dispenser head 16 within dispensing station 12 as incorporated within the banding machine depicted in FIG. 1. Referring to FIGS. 2 and 3 in conjunction with FIG. 1, feed system 15 receives baleband 58 that is then provided to dispenser head 16, which includes a lift cylinder (not depicted) for moving the dispenser/sealing head 16 upwardly during pullback of the baleband. A baleband path block 29 is movable horizontally into a space to provide for proper guidance of the baleband 58 through the dispenser head 16 and into track assembly 20. A shock absorber 36 controls downward movement of dispenser head 16 via a main head lift assembly 28.

In accordance with the present invention, when baleband path block 29 is retracted, a steam applicator or injector mechanism 30 comprising a steam applicator nozzle 31 and a control actuator 32 are utilized to discharge a jet of steam or superheated steam onto or between the overlapping portions of baleband 58. Actuator 32 is preferably an electronic mechanism having circuit means for delivering steam discharge timing signals that control the opening and closing of an electronically controlled steam valve (not depicted) within the housing of steam applicator mechanism 30. Although not explicitly depicted, steam applicator mechanism 30 includes well-known structures and features including a water source and a heated pressurizer in which steam is generated and maintained at the desired temperature and pressure prior to release through steam applicator nozzle 31. Alternatively, nozzle 31 may be maintained at an elevated temperature such that water forced therethrough is converted to steam prior to or upon exit from the applicator nozzle 31. Any suitable steam production and delivery equipment or system may be utilized to provide steam at the proper location.

A front brake 38 is movable by a front brake cylinder 33 and a rear brake 40 is movable via a cylinder 39 with guides 38' and 40' guiding the movement of the respective brakes. Cutter 41 provides a shear force cutting edge for baleband 58 that has been moved through path 43 when a joint press head 42 is moved upwardly by a hydraulic secondary press cylinder 35 as will be discussed herein below. Frame plates 47 are slideably engaged by a head plate frame member 46 that is movable vertically by main lift assembly 28. A path plate 45 has path 43 machined therein and rests on shock absorber 36 and main lift assembly 28. A baleband exit slot 48 is formed between frame members 45, 47 and a bale contact head plate 44 which is attached to movable head plate frame member 46 via bolts 50. A joint press head operating space 49 exists between press head 42 and bale contact head plate 44, which preferably comprises a beveled anvil plate. Press head operating space 49 is also the space in which baleband path block 29 and steam applicator mechanism 30 operate as will be discussed more detail herein below.

Referring to FIG. 3, which illustrates in pictorial form the relative position of some of the major components of the dispenser head 16, baleband 58 is sent into dispenser head 16 via baleband path 43 from feed system 15. A baleband block 54 guides the baleband 58 as it crosses over joint head press 42 in operating space 49. The baleband 58 is directed over front brake 38 having engaging teeth 61 and into track assembly 20. The baleband 58 is returned from track assembly 20 and over rear brake 40 having engaging teeth 60. A reversible feed motor (not depicted) that pulls the baleband from the loop storage magazine 14' and directs it into a feed track segment is then stopped in response a feed control signal from an encoder device (not depicted) to place a leading edge portion 59 of baleband 58 over joint press head 42. At this time, the rear brake 40 moves upwardly to engage the baleband 58 against bale contact head plate 44. Baleband path block 29 is retracted after loading (the same time rear brake 40 is activated). The feed motor is then reversed in direction to pull the baleband 58 backwards through path 43 causing it to be pulled out of track assembly 20. The feed motor is controlled to limit the pullback force to that which is expected for a standard package. Excessive pullback, detected as a function of length by the encoder device, is indicative of a malfunction such as baleband breakage. Once pullback is complete, front brake 38 is moved upward to engage the baleband 58 between teeth 61 and bale contact head plate 44.

Actuator 32 preferably includes circuit sequencer or sensor means for coordinating the discharge of pressurized steam from steam applicator nozzle 31 with the tightening of baleband 58 around the bale. To this end, and in one embodiment, the actuator signal opening the steam valve within steam applicator mechanism 30 is delivered in sequence following the baleband pullback. Furthermore, the actuator signal is preset to effectuate a steam discharge over a specified period before the valve is shut in preparation for the next banding cycle. During each activation interval, applicator nozzle 31 discharges pressurized steam into the space formerly occupied by upper block section 56, i.e., into the interior area between the overlapped portions of the baleband 58. Dispenser head 16 is raised exposing exit slot 48. Pneumatic cylinder 35 lifts joint press head 42 thereby forcing mutual contact of the overlapped leading and trailing edges of baleband 58. With the steam having been applied to the overlapped ends, the thermal and moisture activated adhesive within the band activates and partially cures, resulting in a firm coupling of the overlapped baleband portions. Simultaneous with the sealing action, the high pressure applied by hydraulic cylinder 34 to joint head press 42 pushes the trailing portion of the baleband 58 upward shearing off the lower portion against cutter 41 and pressing the baleband ends tightly against bale contact head plate 44 resulting in a sealed joint. Once the seal is secured in place, the package is moved via conveyor system 13.

While this invention has been described in terms of several embodiments, it is contemplated that alterations, permutations, and equivalents thereof will become apparent to one of ordinary skill in the art upon reading this specification in view of the drawings supplied herewith. In particular, it is to be understood that various structural embodiments for the steam applicator or injector means may be utilized, and the steam applicator or injector means and the method of application or injection may be utilized with bale banding machines of different structure and operation from the representations described above. It is therefore intended that the invention and any claims related thereto include all such alterations, permutations, and equivalents that are encompassed by the spirit and scope of this invention, and the that the true scope and definition of the invention be as set forth in the following claims.

I claim:

1. A bale banding machine that bands bundles of material using a thermal and moisture activated adhesive baleband, said bale banding machine comprising:
   means for guiding the baleband around a bale;
   means for tightening the baleband around the bale such that portions of the baleband are overlapped; and
   means for sealing the overlapped portion of the baleband, wherein said means for sealing includes a steam applicator for applying steam to the overlapped portions of the baleband.

2. The bale banding machine of claim 1, further comprising means for pressing together the overlapped portions of the baleband to which the steam is applied.

3. The balebanding machine of claim 1, wherein said steam applicator comprises a steam applicator nozzle for discharging a pressurized steam jet between the overlapped portions of the baleband.

4. The balebanding machine of claim 3, wherein said sealing means includes an actuator for providing timed control of steam discharge from the steam applicator nozzle.

5. The balebanding machine of claim 4, wherein said actuator includes circuit means for actuating steam discharge from said steam applicator nozzle over specified time intervals.

6. The balebanding machine of claim 5, wherein said actuator includes a control circuit for coordinating the steam discharge intervals with the tightening of the baleband around the bale.

7. The balebanding machine of claim 1, wherein said means for guiding the baleband around a bale and said means for tightening the baleband around the bale includes a baleband feed motor.

8. A method for banding bundles of material using a thermal and moisture activated adhesive baleband, said method comprising:
   guiding the baleband around a bale;
   tightening the baleband around the bale such that portions of the baleband are overlapped; and
   sealing the overlapped portions of the baleband, wherein said sealing includes applying steam to the overlapped portions of the baleband.

9. The method of claim 8, further comprising pressing together the overlapped portions of the baleband to which the steam is applied.

10. The method of claim 8, wherein said applying steam to the overlapped portions of the baleband comprises discharging a pressurized steam jet between the overlapped portions of the baleband.

11. The method of claim 10, wherein said discharging a directed steam jet toward the overlapped portions of the baleband includes providing timed control of steam discharge from the steam applicator nozzle.

12. The method of claim 11, wherein said providing timed control of steam discharge from the steam applicator nozzle includes actuating steam discharge from said steam applicator nozzle over specified time intervals.

13. The method of claim 12, wherein said providing timed control of steam discharge from the steam applicator nozzle includes coordinating the steam discharge intervals with the tightening of the baleband around the bale.

14. A bale banding machine that bands bundles of material using a thermal and moisture activated adhesive baleband, said bale banding machine comprising:
   means for guiding the baleband around a bale;
   means for tightening the baleband around the bale such that portions of the baleband are overlapped;
   means for sealing the overlapped portion of the baleband, wherein said means for sealing includes an applicator for applying water to the overlapped portions of the baleband, said water possessing sufficient thermal energy to effect adhesion of said overlapped portions; and
   means for pressing together the overlapped portions of the baleband to which the water is applied;
   wherein said water applicator comprises a water applicator nozzle for discharging a pressurized water jet between the overlapped portions of the baleband.

15. The balebanding machine of claim 14, wherein said sealing means includes an actuator for providing timed control of water discharge from the water applicator nozzle.

16. The balebanding machine of claim 15, wherein said actuator includes circuit means for actuating water discharge from said water applicator nozzle over specified time intervals.

17. The balebanding machine of claim 16, wherein said actuator includes a control circuit for coordinating the water discharge intervals with the tightening of the baleband around the bale.

18. The balebanding machine of claim 14, wherein said means for guiding the baleband around a bale and said means for tightening the baleband around the bale includes a baleband feed motor.

19. A method for banding bundles of material using a thermal and moisture activated adhesive baleband, said method comprising:
   guiding the baleband around a bale;
   tightening the baleband around the bale such that portions of the baleband are overlapped; and
   sealing the overlapped portions of the baleband, wherein said sealing includes applying water to and pressing together the overlapped portions of the baleband, said water possessing sufficient thermal energy to effect adhesion of said overlapped portions; and
   wherein said applying water to the overlapped portions of the baleband comprises discharging a pressurized water jet between the overlapped portions of the baleband.

20. The method of claim 19, wherein said discharging a directed water jet toward the overlapped portions of the baleband includes providing timed control of water discharge from the water applicator nozzle.

21. The method of claim 20, wherein said providing timed control of water discharge from the water applicator nozzle includes actuating water discharge from said water applicator nozzle over specified time intervals.

22. The method of claim 21, wherein said providing timed control of water discharge from the water applicator nozzle includes coordinating the water discharge intervals with the tightening of the baleband around the bale.

* * * * *